United States Patent
Hathorn et al.

(10) Patent No.: US 10,764,199 B2
(45) Date of Patent: *Sep. 1, 2020

(54) ADJUSTMENT OF AN INFORMATION UNIT PACING CREDIT TO INCREASE DATA TRANSMISSION RATE

(71) Applicant: INTERNATIONAL BUSINESS MACHINES CORPORATION, Armonk, NY (US)

(72) Inventors: Roger G. Hathorn, Tucson, AZ (US); Bret W. Holley, Tucson, AZ (US); Harry M. Yudenfriend, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/241,908

(22) Filed: Jan. 7, 2019

(65) Prior Publication Data

US 2019/0140968 A1    May 9, 2019

Related U.S. Application Data

(63) Continuation of application No. 15/359,327, filed on Nov. 22, 2016, now Pat. No. 10,250,516.

(51) Int. Cl.
*H04L 12/801* (2013.01)
*H04L 29/08* (2006.01)
*H04L 12/911* (2013.01)

(52) U.S. Cl.
CPC .............. *H04L 47/39* (2013.01); *H04L 47/82* (2013.01); *H04L 67/1097* (2013.01)

(58) Field of Classification Search
None
See application file for complete search history.

(56) References Cited

U.S. PATENT DOCUMENTS 5,764,699 A * 6/1998 Needham .............. H04L 1/0003
375/261
6,014,693 A * 1/2000 Ito ...................... H04N 7/17336
348/E7.073

(Continued)

OTHER PUBLICATIONS

"Fibre Channel Single-Byte Command Code Sets Mapping Protocol—6 (FC-SB-6) REV 2.00" dated Dec. 9, 2015, INCITS working draft proposed American National Standard for Information Technology, Total 287 pages.

(Continued)

*Primary Examiner* — Ayaz R Sheikh
*Assistant Examiner* — Tarell A Hampton
(74) *Attorney, Agent, or Firm* — Rabindranath Dutta; Konrad, Raynes, Davda and Victor LLP

(57) ABSTRACT

A first device determines whether an indicator is configured to allow use of an increased value for an information unit pacing credit that is greater than a default value for the information unit pacing credit, where the information unit pacing credit indicates a number of information units that a second device is allowed to send to the first device without waiting for any additional response from the first device. In response to determining that the indicator is configured to allow use of the increased value for the information unit pacing credit that is greater than the default value for the information unit pacing credit, the first device adjusts the information unit pacing credit via a response sent from the first device to the second device, to the increased value that is greater than the default value.

18 Claims, 11 Drawing Sheets

(56) References Cited

U.S. PATENT DOCUMENTS

| | | | | |
|---|---|---|---|---|
| 6,298,041 | B1* | 10/2001 | Packer | H04L 1/0002 370/231 |
| 6,466,586 | B1* | 10/2002 | Darveau | H04J 3/1682 370/353 |
| 6,657,954 | B1* | 12/2003 | Bird | H04L 47/10 370/229 |
| 6,907,048 | B1* | 6/2005 | Treadaway | H04L 1/0003 370/474 |
| 7,668,980 | B2 | 2/2010 | Hathom et al. | |
| 8,069,465 | B1* | 11/2011 | Bartholomay | H04L 47/14 370/395.4 |
| 8,203,940 | B1* | 6/2012 | Yuan | H04L 1/0002 370/229 |
| 8,407,358 | B1* | 3/2013 | Hess | H04L 29/06517 370/412 |
| 2002/0141349 | A1* | 10/2002 | Kim | H04W 28/22 370/252 |
| 2003/0073443 | A1* | 4/2003 | Bae | H04L 1/0002 455/450 |
| 2003/0093364 | A1* | 5/2003 | Bae | G06Q 40/04 705/37 |
| 2003/0128672 | A1* | 7/2003 | Komandur | H04L 1/1809 370/315 |
| 2003/0165150 | A1* | 9/2003 | Zimmermann | H04L 29/06027 370/412 |
| 2005/0015517 | A1* | 1/2005 | Fike | H04L 47/30 709/250 |
| 2007/0060138 | A1* | 3/2007 | Kwak | H04W 28/22 455/445 |
| 2008/0172236 | A1 | 7/2008 | Takala | |
| 2009/0083447 | A1 | 3/2009 | Hathom et al. | |
| 2013/0286886 | A1* | 10/2013 | Laabs | H04L 1/0002 370/252 |
| 2016/0041942 | A1 | 2/2016 | Pandit et al. | |
| 2016/0342548 | A1 | 11/2016 | Hathom et al. | |

OTHER PUBLICATIONS

"Fibre Channel Single-Byte Command Code Sets Mapping Protocol—5 (FC-SB-5) REV 2.00", dated Mar. 26, 2013, INCITS working draft proposed American National Standard for Information Technology, Total 269 pages.

US Patent Application, dated Nov. 22, 2016, for U.S. Appl. No. 15/359,327, filed Nov. 22, 2018, invented by Roger Hathorn et al., Total 38 pages.

Preliminary Amendment, dated Dec. 6, 2018, for U.S. Appl. No. 15/359,327, filed Nov. 22, 2018, invented by Roger Hathom et al., Total 14 pages.

Office Action, dated Jun. 26, 208, for U.S. Appl. No. 15/359,327, filed Nov. 22, 2018, invented by Roger Hathom et al., Total 20 pages.

Response to Office Action, dated Sep. 26, 2018, for U.S. Appl. No. 15/359,327, filed Nov. 22, 2018, invented by Roger Hathom et al., Total 12 pages.

Notice of Allowance, dated Nov. 16, 2018, for U.S. Appl. No. 15/359,327, filed Nov. 22, 2018, invented by Roger Hathom et al., Total 11 pages.

List of IBM Patents and Patent Applications Treated as Related dated Jan. 7, 2019, pp. 2.

* cited by examiner

ADJUSTMENT OF AN INFORMATION UNIT PACING CREDIT TO INCREASE DATA TRANSMISSION RATE

CROSS-REFERENCE TO RELATED APPLICATION

This application is a continuation of U.S. patent application Ser. No. 15/359,327, filed Nov. 22, 2016, which application is incorporated herein by reference in its entirety.

BACKGROUND

1. Field

Embodiments relate to the adjustment of an information unit pacing credit to increase the rate of data transmission.

2. Background

Fibre Channel refers to an integrated set of architectural standards for data transfer developed by the American National Standards Institute. Fibre Connection (FICON) is a protocol of the Fibre Channel architecture and may also be referred to by the formal names of FC-SB-6, FC-SB-5, and other formal names used in other previously adopted FICON protocols. Further details of FC-SB-6 may be found in the publication, "Fibre Channel Single-Byte Command Code Sets Mapping Protocol—6 (FC-SB-6)", Rev. 2.00, published by the American National Standards Institute (ANSI) on Dec. 9, 2015. Further details of FC-SB-5 may be found in the publication, "FIBRE CHANNEL Single-Byte Command Code Sets Mapping Protocol—5 (FC-SB-5)", Rev. 2.0, published by ANSI on Mar. 26, 2013.

A channel is a direct or a switched point-to-point connection between communicating devices. In the Fibre Channel architecture, a FICON channel may perform the functions specified by FC-SB-6 or FC-SB-5 or other previously adopted FICON protocols to provide access to Input/Output (I/O) devices by means of control units or emulated control units. FICON channels may rely on packet switching for transferring data between communicating devices.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may transmit up to sixteen channel command words at a time along with the associated data for any write operations, where a channel command word and/or the associated data may be referred to as "information units" (IU). The channel command word may be referred to as a command IU, and the associated data may be referred to as a data IU. An IU may comprise a collection of data that is organized according to a particular structure depending on the function being performed or the data content. Information associated with the execution of an I/O operation and the operation of a device is transferred between a channel and a control unit as IUs. For example, in FC-SB-6, IUs may contain FC-SB-6 device-level commands, status, data, data descriptor or control information, or FC-SB-6 link-control information. If more than sixteen IUs are present in a channel program then the additional IUs are sent after a response received by the channel program.

SUMMARY OF THE PREFERRED EMBODIMENTS

Provided are a method, system, and computer program product in which a first device determines whether an indicator is configured to allow use of an increased value for an information unit pacing credit that is greater than a default value for the information unit pacing credit, where the information unit pacing credit indicates a number of information units that a second device is allowed to send to the first device without waiting for any additional response from the first device. In response to determining that the indicator is configured to allow use of the increased value for the information unit pacing credit that is greater than the default value for the information unit pacing credit, the first device adjusts the information unit pacing credit via a response sent from the first device to the second device, to the increased value that is greater than the default value.

In additional embodiments, in response to determining that the indicator is configured to allow use of the increased value for the information unit pacing credit that is greater than the default value for the information unit pacing credit, the first device adjusts the information unit pacing credit via a response sent from the first device to the second device, to the default value.

In further embodiments, in response to determining, by the second device, that the second device is unable to utilize an entirety of the information unit pacing credit, the number of information units sent by the second device to the first device is decreased based on a workload of the second device.

In yet further embodiments, the first device allocates additional resources for consuming the information units corresponding to the increased value of the information unit pacing credit, and restricts input/output (I/O) operations that previously used the additional resources.

The certain embodiments, the default value is 16, and the increased value is at least 64.

In further embodiments, persistent information unit pacing that supports the information unit pacing credit is implemented over a Fibre Channel connection, where the indicator is an IU pacing parameter of the Fibre Channel connection, and where in response to the IU pacing parameter being configured to allow use of the increased value for the information unit pacing credit that is greater than the default value for the information unit pacing credit by setting a value of the IU pacing parameter to be one or more, all existing logical paths are configured to allow transmission of a number of information units corresponding to the increased value of the information unit pacing credit.

In additional embodiments, the information unit pacing credit to use is maintained for each logical path between the first device and the second device, where the information unit pacing credit is adjusted in response to an establishment of a logical path.

BRIEF DESCRIPTION OF THE DRAWINGS

Referring now to the drawings in which like reference numbers represent corresponding parts throughout.

DETAILED DESCRIPTION

Figure 1:
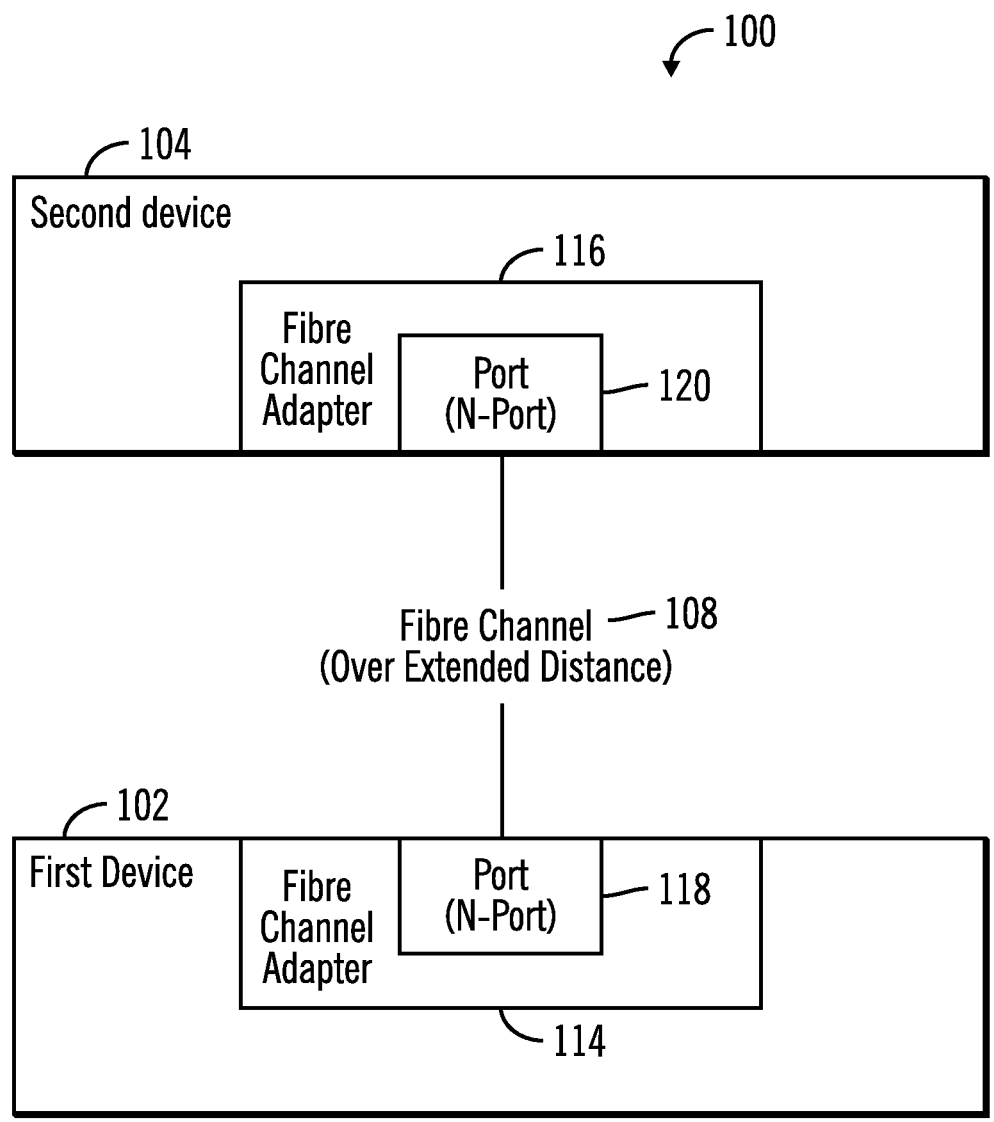
FIG. 1 illustrates a block diagram of a computing environment comprising a first device coupled to a second device, in accordance with certain embodiments.

In the following description, reference is made to the accompanying drawings which form a part hereof and which illustrate several embodiments. It is understood that other embodiments may be utilized and structural and operational changes may be made.

Information Unit (IU) pacing credit is the maximum number of IUs that a FICON Channel may send to a FICON Control Unit to execute an I/O operation before the FICON channel has to request and receive a command-response IU from the control unit. The default pacing credit in the FICON standard (FC-SB-6, FC-SB-5) is 16 and has been that way since 1 Gigabits per second Fibre Channel. As link speeds increase, more bits may need to be transmitted to operate a link at its full capacity and the current default IU pacing credit may become a limiting factor at certain link distances.

With the use of FICON's persistent pacing capability, the control unit may modify the IU pacing credit available at the channel as channels log in and execute I/O. However, sufficient resources need to be available to receive the added additional workload of information units coming from the channel. Certain devices may be able to provide a significant increase in the IU pacing credit, allowing for much larger chains of information units to be executed without intervening handshakes. This may provide a large benefit for data transmission at long distances where the mere physics of the speed of light introduces latencies of 5 microseconds per kilometer, or 10 microseconds per km for a round trip.

In prior art, the IU Pacing parameter is set to 0 as a default, and this sets the IU pacing credit to the default value of 16. Certain embodiments configure the IU Pacing parameter (i.e., an indicator) in a command response information unit to a value that is greater than zero, to adjust the IU pacing credit to an increased value that is greater than the default value of 16.

The current value of the IU pacing credit to use is maintained on a logical path basis and the setting of this value is preserved across warmstart recovery and concurrent code load of Fibre Channel adapters. When the IU pacing parameter is changed to a value greater than zero from a previously set value of zero, all current pacing values kept in the existing logical path entries are modified to a new increased pacing value. When the IU pacing parameter is set to zero, the IU pacing credit is restored to the lower default of 16. As logical channels log in, the value for the IU pacing credit is based on whether the IU pacing parameter is configured to zero or some other value greater than zero.

In certain embodiments, channels that are unable to keep up with the current IU pacing credit do not have to use all the IU pacing credit. Instead, such channels may reduce the amount of IU pacing credits used, based on the current workload of the channel. In the control unit, resources consumed by the new additional workload caused by increased arrival of information units are managed by proper allocation of resources based on the IU pacing credit allowed and by restricting the number of I/O operations that may use the allocated resources.

Exemplary Embodiments

FIG. 1 illustrates a block diagram of a computing environment 100 utilizing a first device 102 coupled to a second device 104. The first device 102 may connect to the second device 104 through a data interface channel, such as Fibre Channel 108 or any other data interface mechanism known in the art. The first device 102 and the second device 104 may be any suitable computational device presently known in the art, such as a personal computer, a workstation, a server, a mainframe, a hand held computer, a telephony device, a network appliance, etc. The first device 102 and the second device 104 may be elements in any suitable network, such as, a storage area network, a wide area network, the Internet, an intranet, etc. In certain embodiments, first device 102 and the second device 104 may be elements in a cloud computing environment.

Communications over the Fibre Channel 108 between the second device 104 and the first device 102 may be enabled by a Fibre Channel adapter 114 included in the first device 102 and a Fibre Channel adapter 116 included in the second device 104. The Fibre Channel adapter 114 included in the first device 102 includes a port 118, and the Fibre Channel adapter 116 included in the second device 104 includes a port 120, where the ports 118 and 120 may be referred to as N-ports in Fibre Channel terminology. Fibre Channel based communications via the FICON protocol may be performed between the port 118 of the first device 102 and the port 120 of the second device 104. A plurality of logical paths may be established between the two Fibre Channel adapters 114, 116.

Therefore, FIG. 1, illustrates a computing environment 100 in which first device 102 communicates with the second device 104 via the FICON protocol. The distance between the first device 102 and the second device 104 may be many kilometers and may even exceed hundreds of kilometers.

Figure 2:
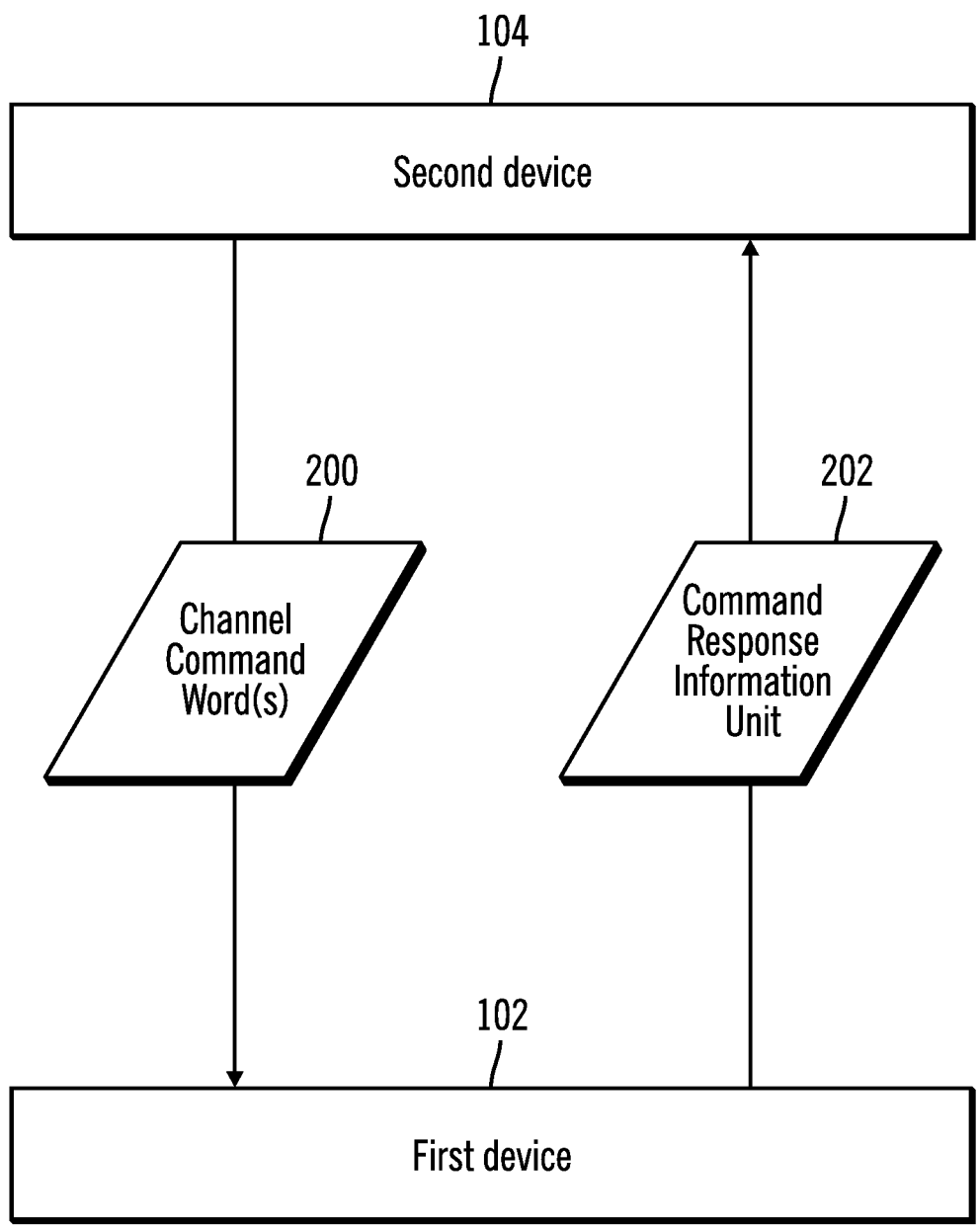
FIG. 2 illustrates a block diagram that shows communications between a first device and a second device, in accordance with certain embodiments.

FIG. 2 illustrates a block diagram that shows communications between the first device 102 and the second device 104, in accordance with certain embodiments implemented in the computing environment 100.

The second device 104 is capable of sending one or more channel command words 200 and associated data in a sequence over a channel generated in accordance with the FICON protocol between the second device 104 and the first device 102. The first device 102 may send a command response information unit 202 in response to certain channel command words 200 and associated data. In certain embodiments by adjusting an IU pacing credit (the adjustment of the IU pacing credit being made via an IU pacing parameter in the command response information unit 202), the first device 102 may modify the number of channel command words and associated data (i.e., IUs) that may be in flight between the second device 104 and the first device 102.

Figure 3:
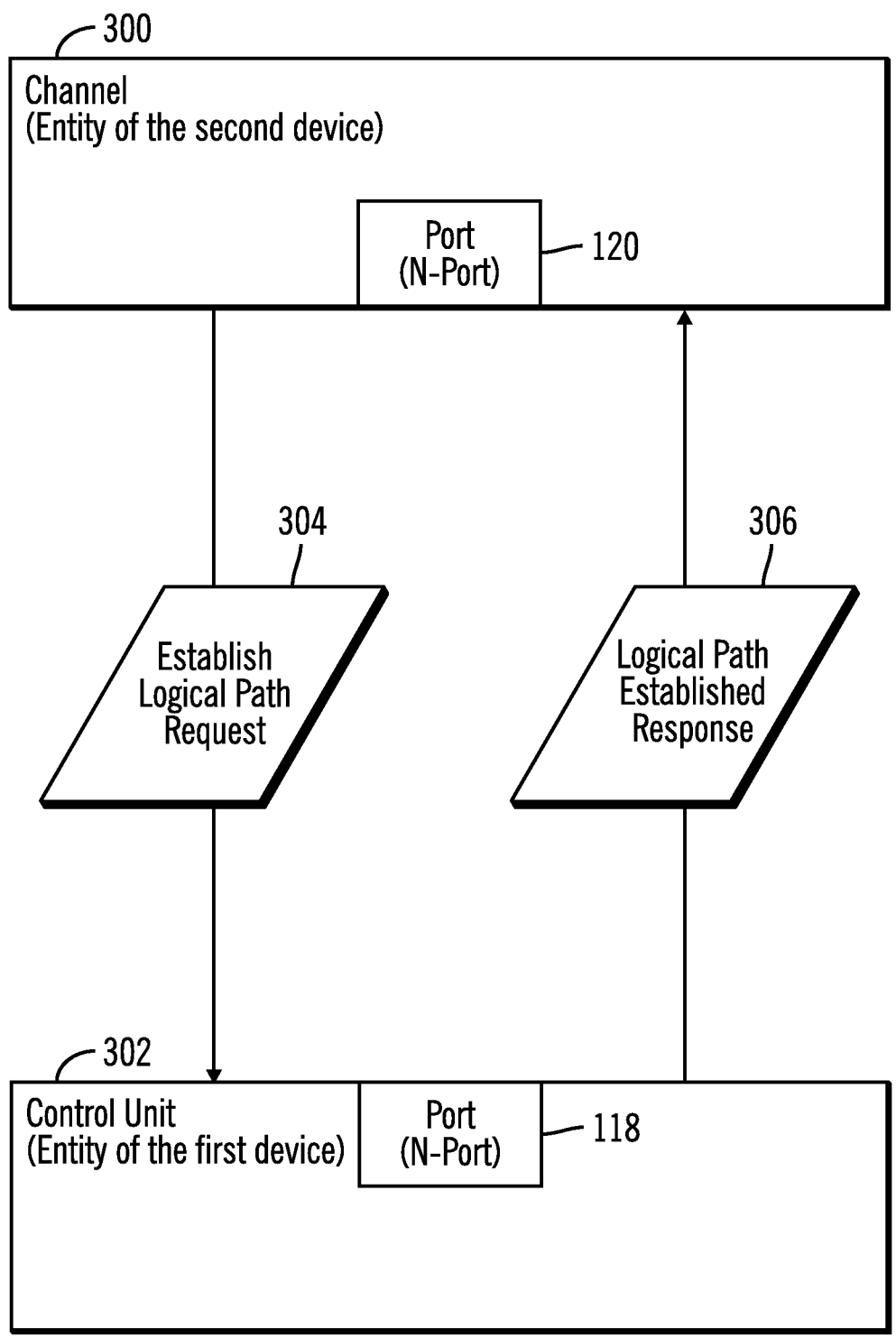
FIG. 3 illustrates a block diagram that shows communications between a channel and a control unit, in accordance with certain embodiments.

FIG. 3 illustrates a block diagram that shows communications between a channel 300 and a control unit 302 implemented in the computing environment 100, in accordance with certain embodiments.

In certain embodiments, the channel 300 is an entity of the second device 104, and includes the port 120. The control unit 302 is an entity of the first device 102 and includes the port 118. A logical path may be established between the channel 300 and the control unit 302.

In certain embodiments, the channel sends an establish logical path (ELP) request 304 to the control unit 302 requesting the establishment of a logical path between the channel 300 and the control unit 302. In response to receiving the establish logical path request 304, the control unit 302 may send a logical path established (LPE) response 306 to the channel 300 and establish the logical path.

In certain embodiments in which persistent IU pacing is implemented in accordance with the FICON architecture, the channel 300 may retain the value of the IU pacing parameter for a subsequent command chain if the control unit 302 indicated support for the retention of the value of the IU pacing parameter when the logical path was established by using the establish logical path request 304 and the logical path established response 306.

Figure 4:
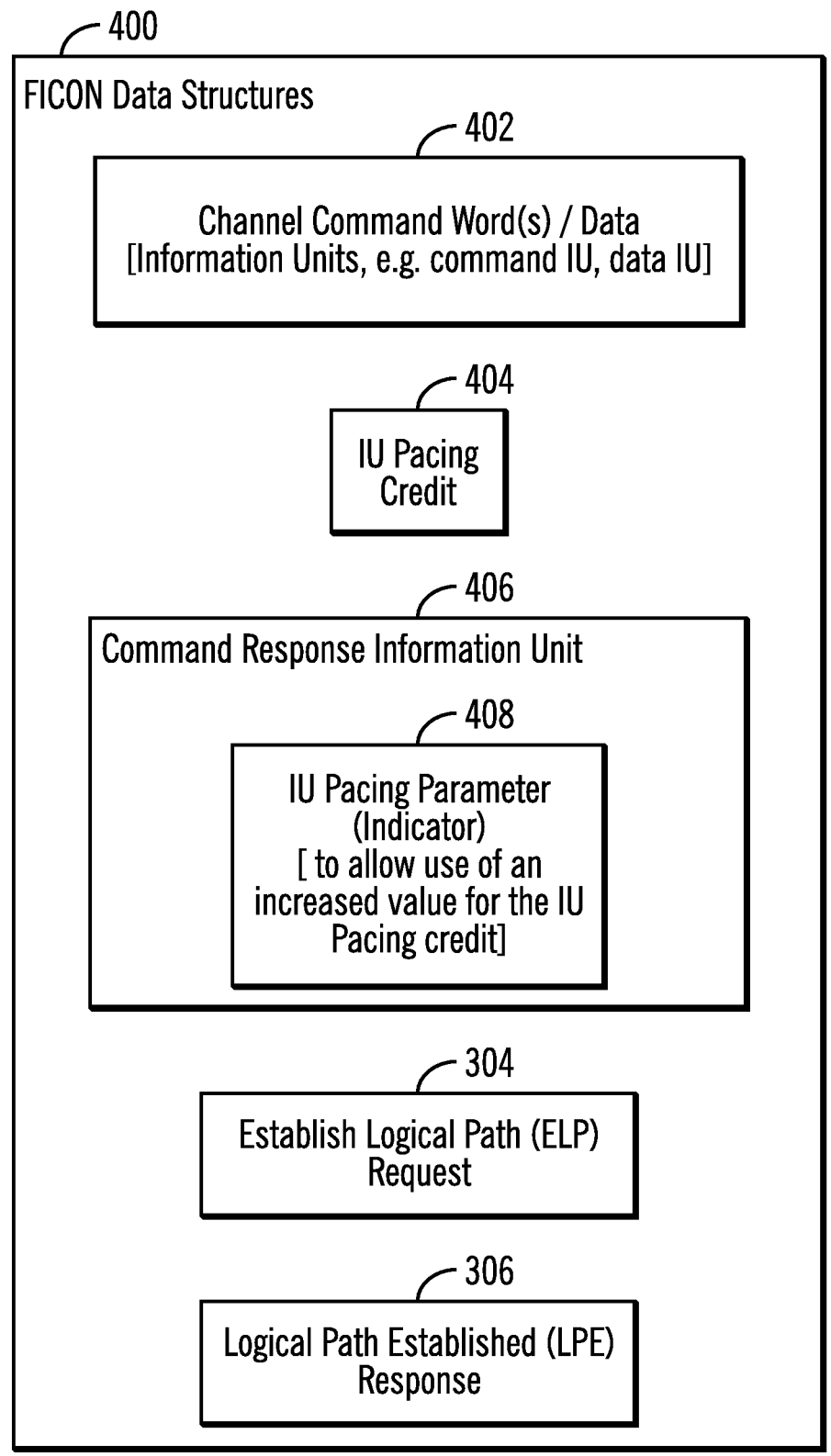
FIG. 4 illustrates data structures associated with a Fibre Channel connection, in accordance with certain embodiments.

FIG. 4 illustrates data structures associated with a Fibre connection (FICON) implemented over the Fibre Channel 108 in the computing environment 100, in accordance with certain embodiments. The data structures shown in FIG. 4 are referred to as FICON data structures 400.

The FICON data structures 400 include one or more channel command words and/or associated data 402 (i.e., IUs), an information unit pacing credit 404, a command response information unit 406 including an information unit pacing parameter 408, where the information unit pacing parameter 408 is also referred to as an IU pacing parameter and the information unit pacing credit 404 may be referred to as an IU pacing credit. The FICON data structures 400 also include an establish logical path request 304 and a logical path established response 306.

The channel command words 402 are control blocks that include I/O requests. For example, in certain embodiments a channel command word 402 may include a read request. The channel command words 402 may be sent from the channel 300 to the control unit 302. A channel command word and/or associated data 402 (e.g., in case of write data) that are sent from the channel 300 to the control unit 302 may also be referred to as information units.

The IU pacing credit 404 may be initialized at either the start of each channel program or during a reconnection to continue the execution of a channel program. The IU pacing credit 404 is the maximum number of information units that the second device 104 may send to the first device 102, before the second device 104 receives the command response information unit 406 from the first device 102. The default value of the IU pacing credit 404 is 16, i.e., a maximum of 16 information units may be sent before the command response information unit 406 is received to send another information units.

A command response information unit 406 is an information unit sent from the first device 102 to the second device 104, in response to certain conditions. An IU pacing parameter 408 of zero in the command response information unit 406 indicates that the value of the IU pacing credit 404 is to remain at the default value (i.e., 16). In certain embodiments, the IU pacing parameter 406 is an eight bit value. However, in other embodiment, the IU pacing parameter 406 may be a data structure that comprises one or more bits, a field, a parameter, or any other data structure in the FICON data structures 400. The IU pacing parameter 408 (also referred to as an indicator) may be configured to allow the use of an increased value for the IU Pacing credit 404, where the increased value is greater than the default value of 16. The IU pacing parameter 408 may also be configured to allow the use of the default value of 16 for the IU Pacing credit 404. For example, in certain embodiments if the IU pacing parameter 408 is set to a value of 0, then then the IU pacing parameter 408 is configured to allow the use of the default value of 16 for the IU Pacing credit 404. In certain embodiments, if the IU pacing parameter 408 is set to a positive value, then the IU pacing parameter 408 is configured to allow the use of an increased value for the IU Pacing credit 404. For example, if the IU pacing parameter 408 is set to a value of 64, then the IU Pacing credit 404 is set to a value of 64.

At the start of a channel program or at each reconnection, the channel 300 may send a number of information units to the control unit 302. The number of information units sent may not exceed the value of the information unit pacing credit 404, where the value of the information unit pacing credit 404 is also referred to as information unit pacing credit value.

The establish logical path (ELP) request 304 may be sent from the channel 300 to the control unit 302 to request the establishment of a logical path between the channel 300 and the control unit 302. The logical path established response 306 from the control unit 302 confirms the successful completion of an establish logical path function request and the establishment of the logical path, and indicates features to be used on all information units sent between the channel 300 and the control unit 302. A persistent pacing control indicator bit included in the establish logical path request 304 is configured to indicate that the channel 300 provides support for persistent pacing, i.e., the retention of the value of the information unit pacing parameter 408 across a plurality of command chains, where a command chain is a sequence of channel command words. Persistent pacing may also be referred to as persistent information unit pacing.

It should be noted that both command and data sent by the channel 300 to the control unit 302 are sent in Information Units (e.g., as 8 KB each) and consume an IU pacing credit provided by the IU Pacing credit 404 data structure.

The logical path established response 306 may be implemented via a function with associated parameters. A persistent pacing control response indicator bit included in the associated parameters is configured to indicate that the control unit 302 provides support for persistent pacing.

Therefore, FIG. 4 illustrates certain embodiments in which an indicator referred to as an IU Pacing Parameter 408 may be configured to increase the IU pacing credit 404 to an increased value that is more than the default value of 16.

Figure 5:
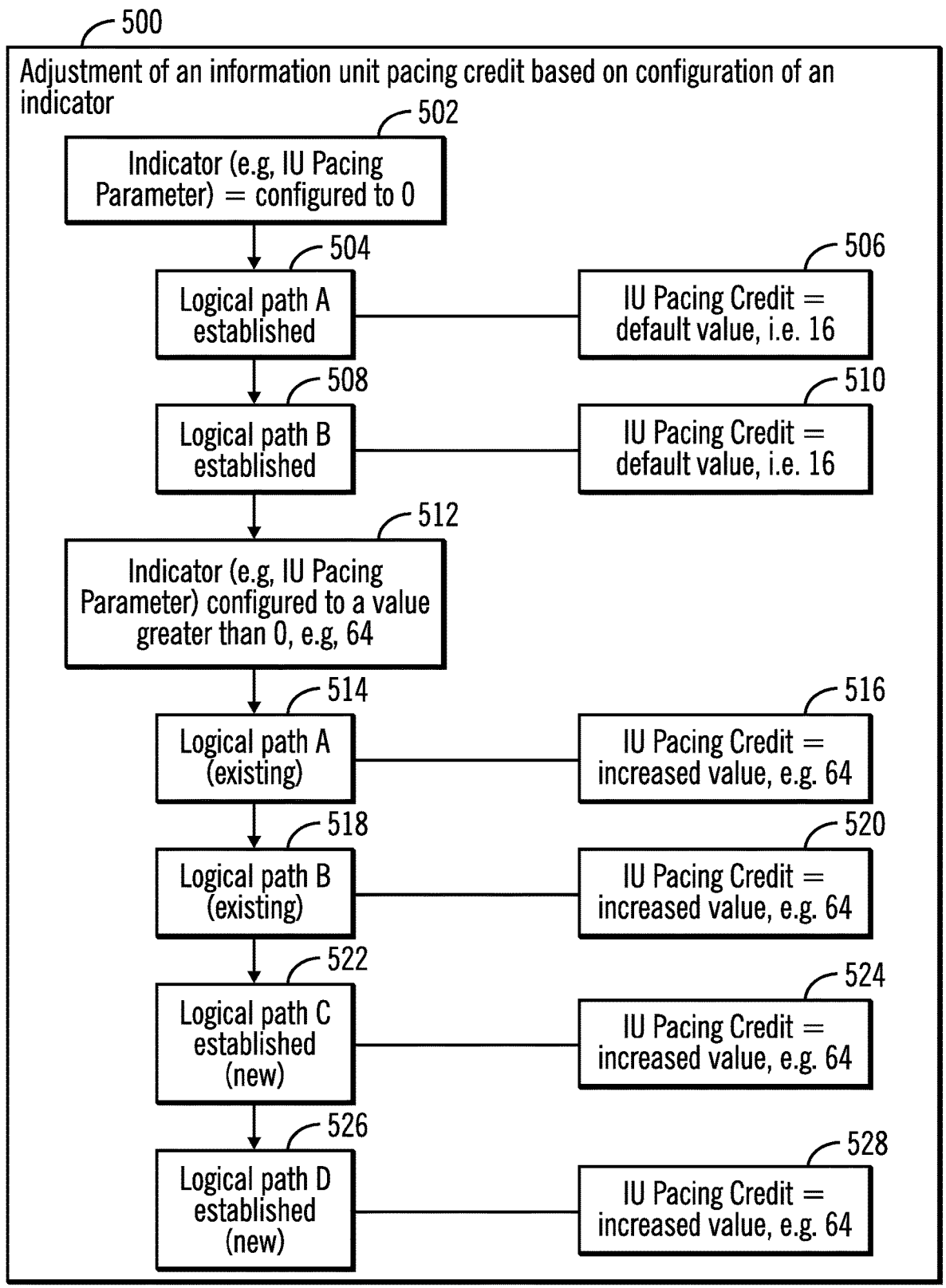
FIG. 5 illustrates a flowchart that shows an adjustment of an information unit pacing credit based on the configuration of an indicator, in accordance with certain embodiments.

FIG. 5 illustrates a flowchart 500 that shows an pacing credit 404 based on configuration an indicator, such as configuration of the IU pacing parameter 408, in accordance with certain embodiments, Control starts at block 502 in which an indicator, such as the IU pacing parameter 408, is configured to 0. Control proceeds to block 504 in which a logical path A is established and the corresponding IU pacing credit 404 is set (at block 506) to the default value of 16, as the IU pacing parameter 408 has been configured to 0. Control proceeds to block 508 in which a logical path B is established and the corresponding IU pacing credit 404 is set (at block 510) to the default value of 16, as the IU pacing parameter 408 has been configured to 0.

Subsequent to block 508 control proceeds to block 512 in which the indicator, such as the IU pacing parameter 408, is configured to a value greater than 0. For example, in the embodiment shown in FIG. 5, the IU pacing parameter 408 is configured to have the value of 64.

From block 512 control proceeds to block 514, and then block 518. At blocks 514 and 518 the previously existing logical paths A and B whose IU pacing credit 404 have previously been set to the default value of 16 now have the IU pacing credit set to the increased value of 64 (at blocks 516, 520), as the IU pacing indicator 408 has been configured to have the value of 64.

From block 518 control proceeds to block 522 and then block 526, and in these blocks new logical paths C and D are established. The IU pacing credit 404 corresponding to these paths is set to the increased value of 64 (at block 524, 528), as the IU pacing parameter 408 has been configured to have the value of 64.

Therefore, FIG. 5 illustrates certain embodiments in which an indicator, such as the IU pacing parameter 408 is configured to a non-zero value to increase the IU pacing credit 404 corresponding to existing and new logical paths to an increased value that is greater than the default value of 16.

FIGS. 1-5 also illustrates that persistent information unit pacing that supports the information unit pacing credit 404 is implemented over a Fibre Channel connection. In response to the IU pacing parameter 408 being configured to allow use of the increased value (greater than the default value) for the information unit pacing credit 404, by setting a value of the IU pacing parameter 408 to be one or more, all existing logical paths are configured to allow transmission of a number of information units corresponding to the increased value of the information unit pacing credit 404 (as shown in blocks 514, 516, 518, 520). The information unit pacing credit 404 to use is maintained for each logical path between the first device 102 and the second device 102, where the information unit pacing credit 404 is adjusted in response to an establishment of a logical path (as shown via at least blocks 522, 524, 526, 528).

Figure 6:
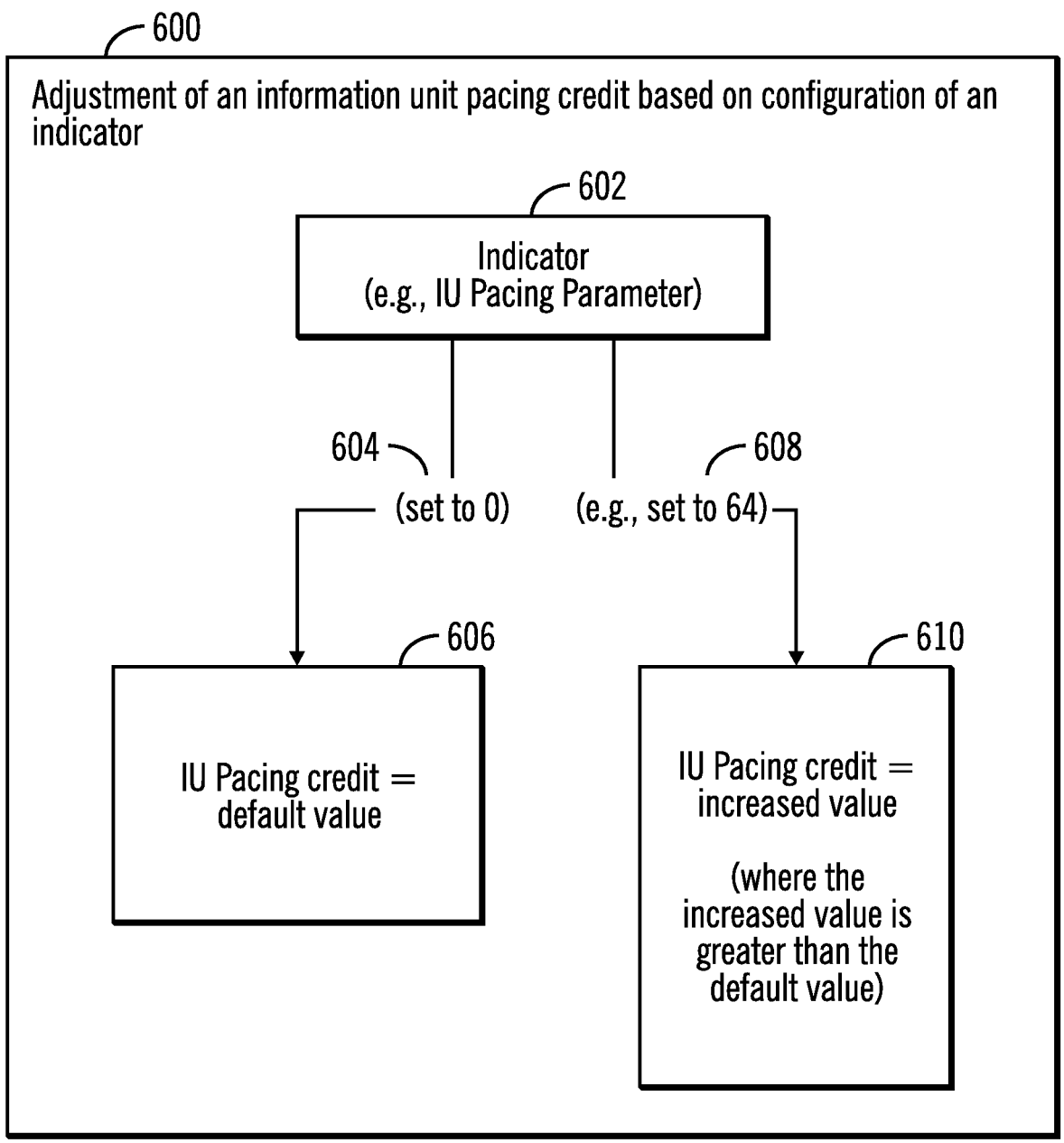
FIG. 6 illustrates a flowchart that shows an adjustment of an information unit pacing credit based on the configuration of an indicator, in accordance with certain embodiments.

FIG. 6 illustrates a flowchart 600 that shows an adjustment of an information unit pacing credit 404 based on the configuration of an indicator, such as the IU pacing parameter 408 in accordance with certain embodiments. In certain embodiments the indicator, such as the IU pacing parameter 408, is configured to 0 (blocks 602, 604), and in such embodiments the IU pacing credit 404 is set to the default value of 16 (at block 606). In other embodiments, the indicator, such as the IU pacing parameter 408, is configured to a non-zero value, such as 64 (blocks 602, 608), and in such embodiments the IU pacing credit 404 is set to an increased value (e.g., 64) that is greater than the default value of 16 (at block 610).

Figure 7:
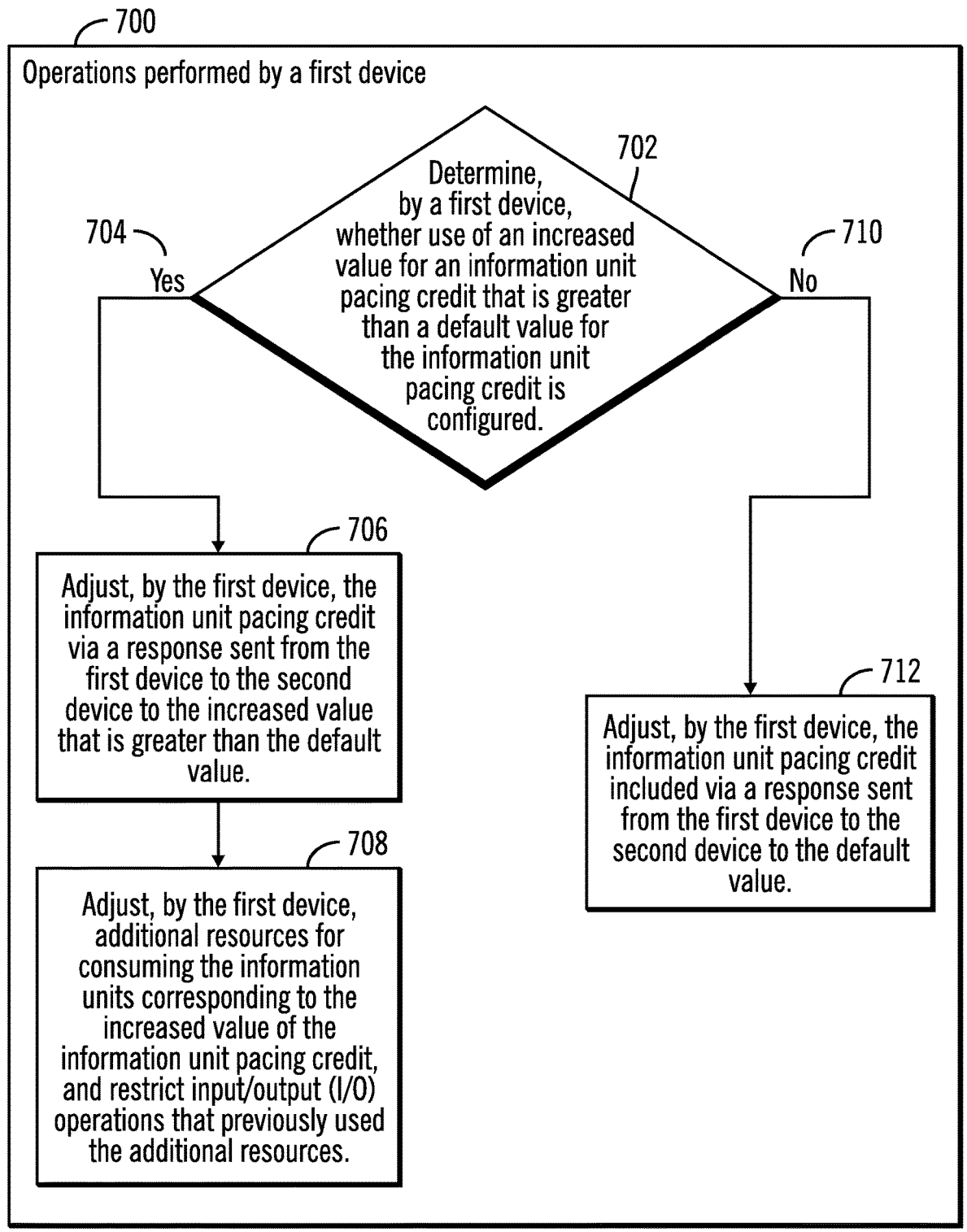
FIG. 7 illustrates a flowchart that shows operations performed by a first device, in accordance with certain embodiments.

FIG. 7 illustrates a flowchart 700 that shows operations performed by a first device 102, in accordance with certain embodiments.

Control starts at block 702 in which the first device 102 determines whether an indicator 408 (e.g., the IU pacing parameter 408) is configured to allow use of an increased value for an information unit pacing credit 404 that is greater than a default value for the information unit pacing credit 404, where the information unit pacing credit 404 indicates a number of information units that a second device 104 is allowed to send to the first device 102 without waiting for any additional response from the first device 102.

In response to determining that the indicator 408 is configured ("Yes" branch 704) to allow use of the increased value for the information unit pacing credit 404 that is greater than the default value for the information unit pacing credit 404, the first device 102 adjusts (at block 706) the information unit pacing credit 404 via a response 406 sent from the first device 102 to the second device 104, to the increased value that is greater than the default value. The first device 102 allocates (at block 708) additional resources for consuming the information units (sent by the second device 104) corresponding to the increased value of the information unit pacing credit 404, and restricts input/output (I/O) operations that previously used the additional resources. It should be noted that additional resources are needed because more information units are received at the first device 102 from the second device 102, in comparison to resources needed for consuming a default number (e.g., 16) of information units. I/O operations that use these additional resources are fully or partially restricted from using these additional resources to avoid overburdening these additional resources.

In response to determining that the indicator 408 is not configured to allow use of the increased value for the information unit pacing credit 404 that is greater than the default value for the information unit pacing credit ("No" branch 710), the first device 102 adjusts the information unit pacing credit 404 via the response 406 sent from the first device 102 to the second device 104 to the default value of 16.

Figure 8:
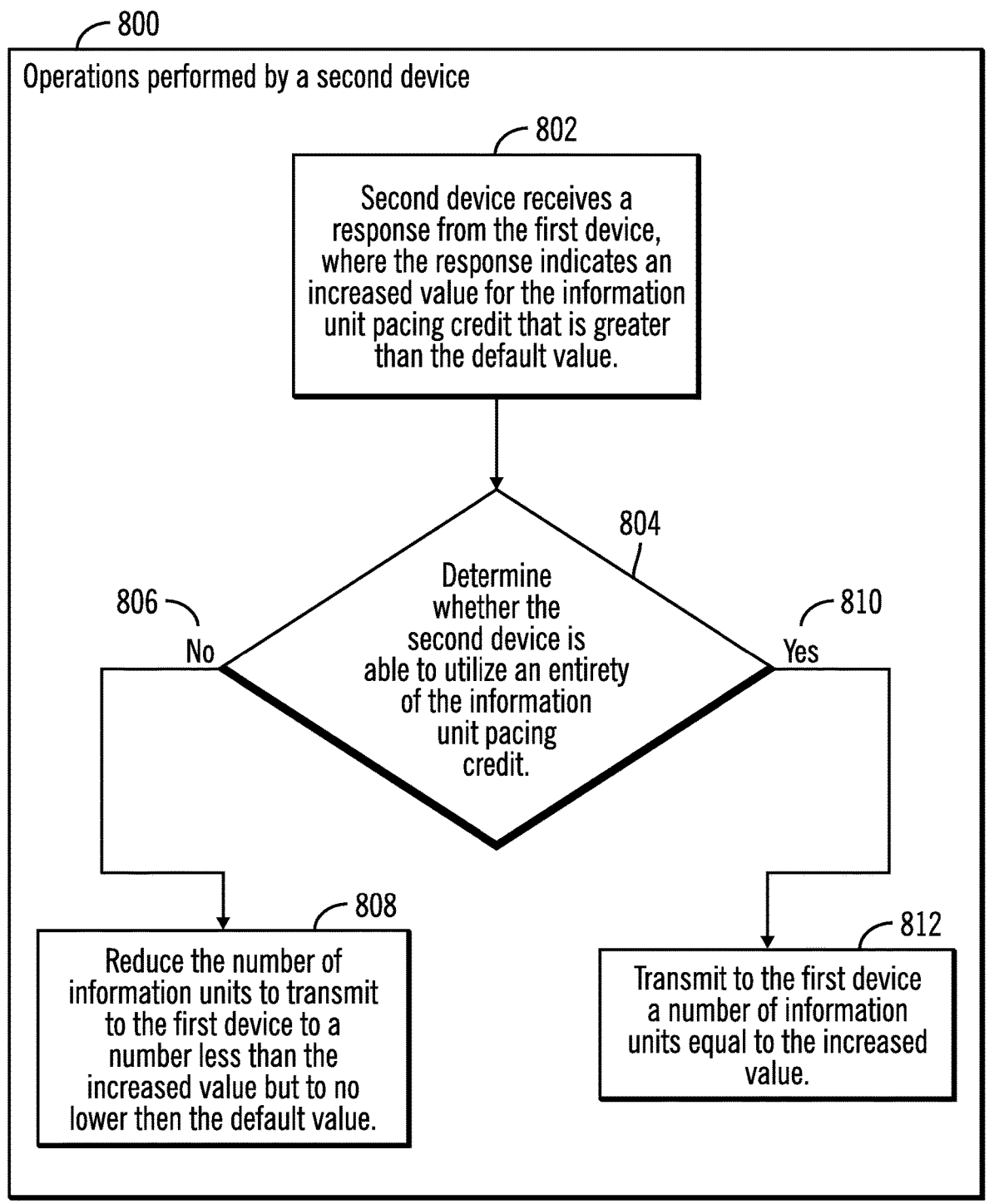
FIG. 8 illustrates a flowchart that shows operations performed by a second device, in accordance with certain embodiments.

FIG. 8 illustrates a flowchart 800 that shows operations performed by a second device 104, in accordance with certain embodiments. Control starts at block 802 in which the second device 104 receives a response 406 from the first device 102, where the response 406 is indicative of an increased value for the information unit pacing credit 404 that is greater than the default value. Control proceeds to block 804 in which the second device 104 determines whether the second device 104 is able to utilize an entirety of the information unit pacing credit 404. For example, if the information unit pacing credit 404 has the value of 64, then at block 604 the second device 104 determines whether the second device 104 is able to or needs to transmit all of the 64 information units to the first device 102.

If at block 804 it is determined that the second device 104 is unable to utilize the entirety of the information unit pacing credit 404 ("No" branch 806) control proceeds to block 808 in which the second device 104 reduces the number of information units to transmit to the first device 102 to a number less than the increased value but to no lower than the default value of 16. It may be noted that in certain embodiments because of the workload of the second device 104, the second device 104 is unable to utilize the entirety of the information unit pacing credit 404. Depending on the amount of workload in the second device 104, the second device 104 may adjust the number of information units transmitted in a sequence to the first device 102.

If at block 804 it is determined that the second device 104 is able to utilize the entirety of the information unit pacing credit 404 ("Yes" branch 810) control proceeds to block 812 in which the second device 104 transmits to the first device 102 a number of information units equal to the increased value of the IU pacing credit 404.

Therefore, FIGS. 1-8 illustrate certain embodiments in which an indicator, such as the IU pacing parameter 408, is configured in Fibre Channel to increase the IU pacing credit 404 to a value greater than the default value of 16. As a result, more information units (equal in number to the IU pacing credit 404 set by the configuration of the IU pacing parameter 408) may be received prior to sending a command response to send an additional batch of information units.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
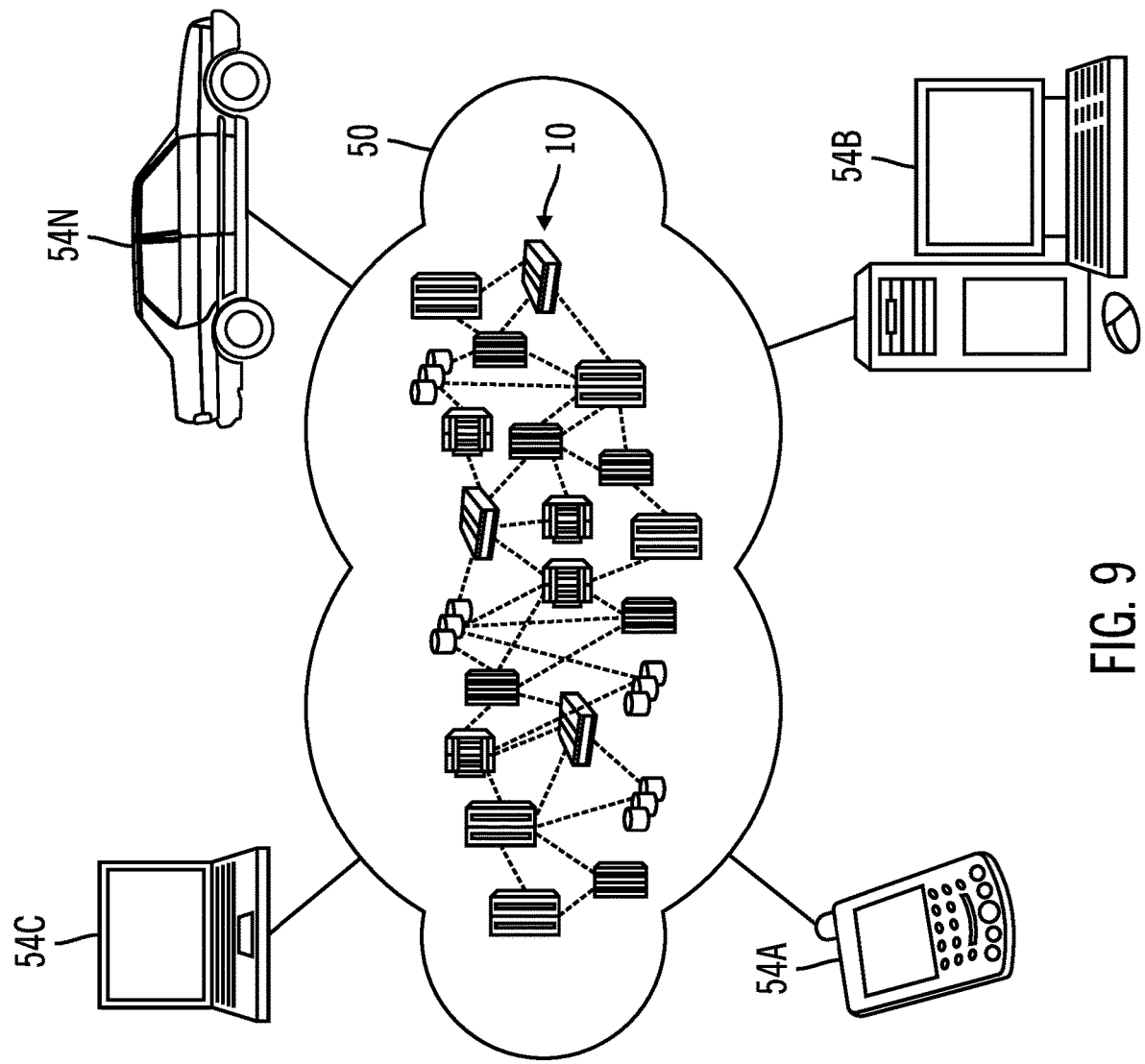
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
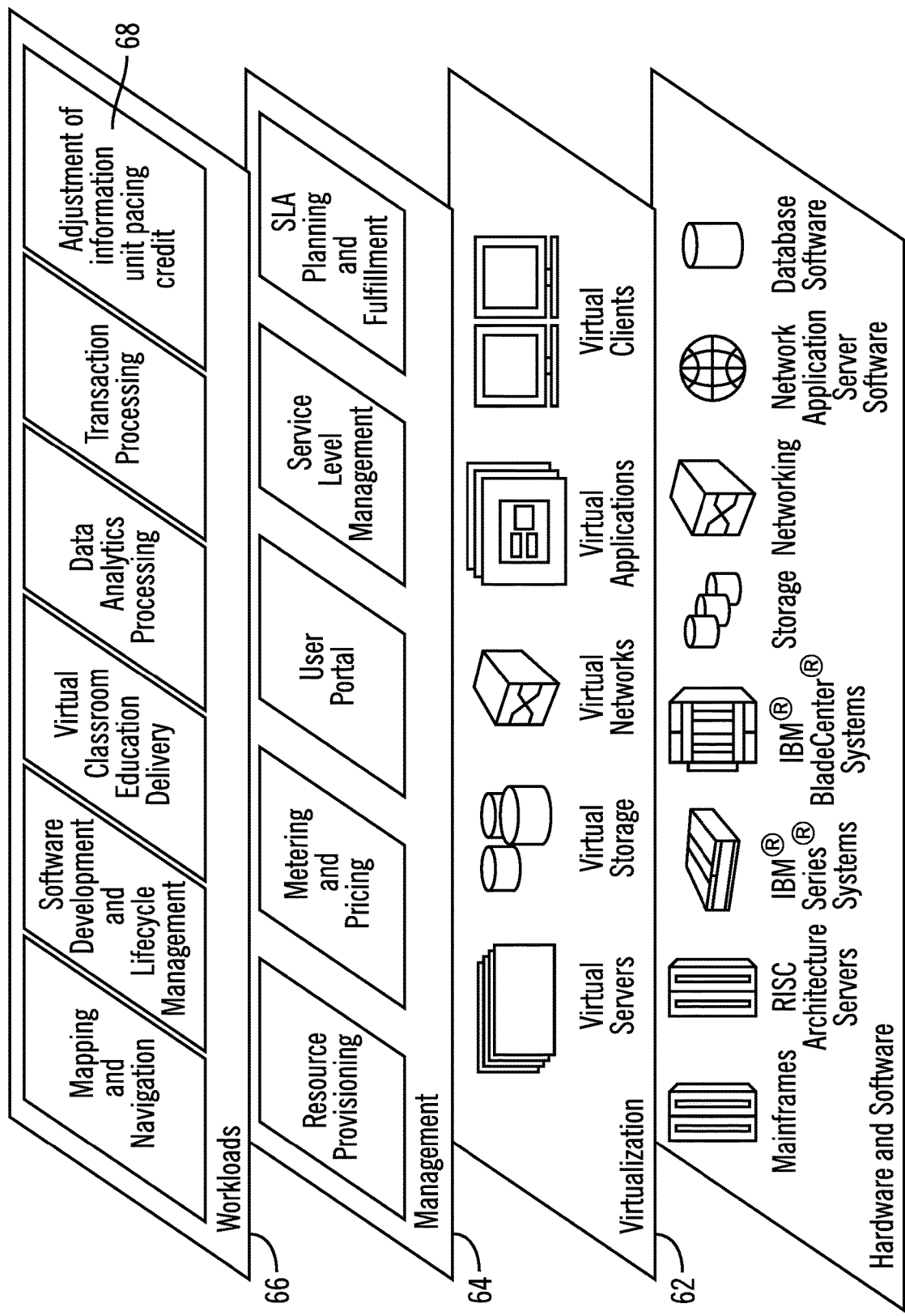
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems;

and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and adjustment of information unit pacing credit 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
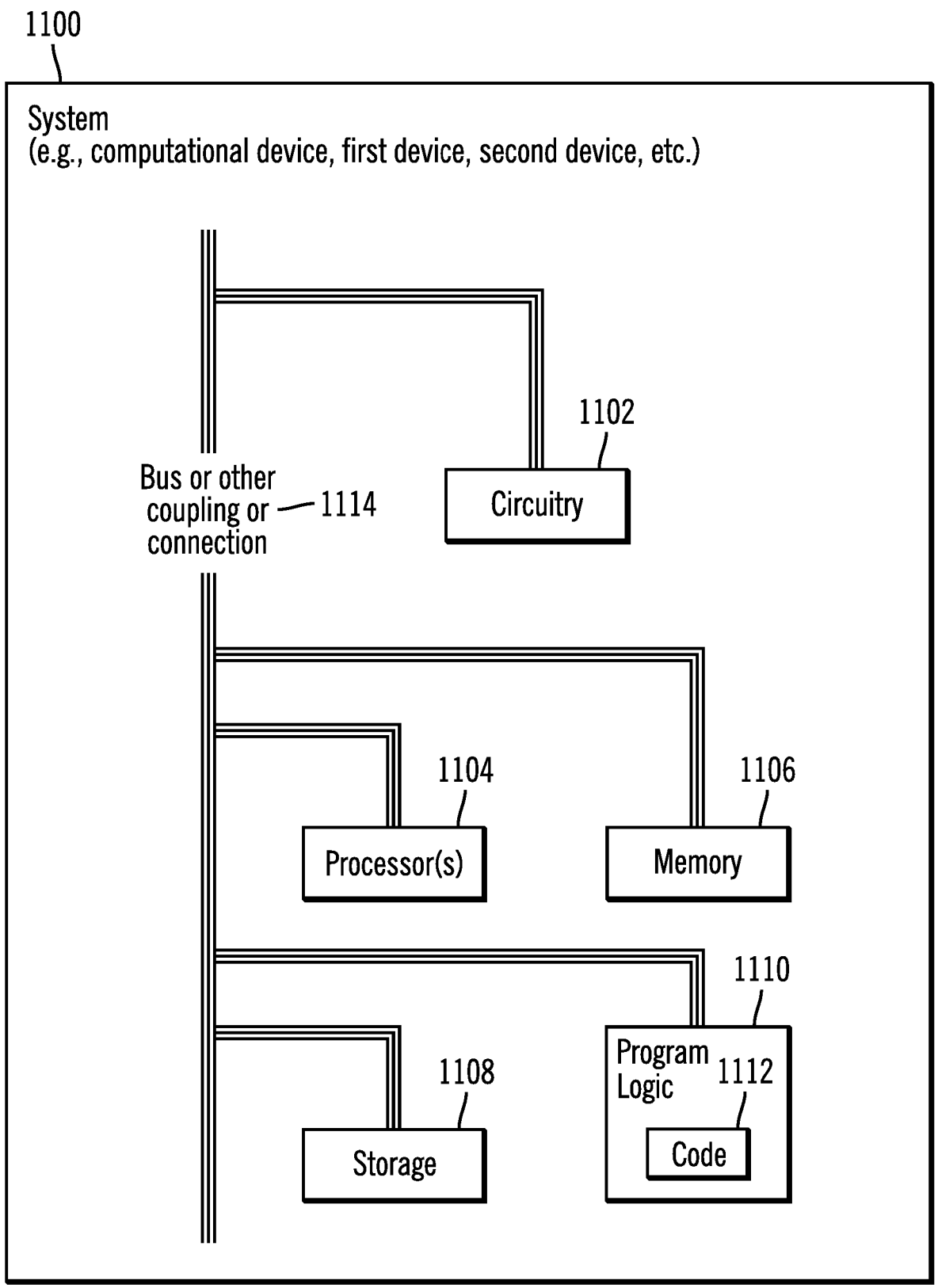
FIG. 11 illustrates a block diagram of a computational system that shows certain elements that may be included in the first device or the second device as described in FIGS. 1-10, in accordance with certain embodiments.

FIG. 11 illustrates a block diagram that shows certain elements that may be included in the first device 102, the second device 104, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. While FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   in response to an information unit pacing parameter being set to a first value of zero, an information unit pacing credit is set to a default value for a first logical path that is established;
   subsequent to the information unit pacing credit being set to the default value for the first logical path, in response to the information unit pacing parameter being set to a second value that is greater than the default value, the information unit pacing credit is set to a second value for the first logical path, and for a newly established second logical path the information unit pacing credit is set to the second value that is greater than the default value; and
   allocating additional resources for consuming information units corresponding to an increased value of the information unit pacing credit, and restricting input/output (I/O) operations that previously used the additional resources.

2. The method of claim 1, wherein the default value is 16, and wherein the increased value is at least 64.

3. The method of claim 1, wherein persistent information unit pacing that supports the information unit pacing credit is implemented over a Fibre Channel connection, wherein the information unit pacing parameter is an IU pacing parameter of the Fibre Channel connection, and wherein in response to the IU pacing parameter being configured to allow use of an increased value for the information unit pacing credit that is greater than the default value for the information unit pacing credit by setting a value of the IU pacing parameter to be one or more, all existing logical paths are configured to allow transmission of a number of information units corresponding to the increased value of the information unit pacing credit.

4. The method of claim 1, wherein the information unit pacing credit to use is maintained for each logical path between a first device and a second device, wherein the information unit pacing credit is adjusted in response to an establishment of a logical path.

5. A system, comprising:
   a memory; and
   a processor coupled to the memory, wherein the processor performs operations, the operations comprising:
     in response to an information unit pacing parameter being set to a first value of zero, an information unit pacing credit is set to a default value for a first logical path that is established;
     subsequent to the information unit pacing credit being set to the default value for the first logical path, in response to the information unit pacing parameter being set to a second value that is greater than the default value, the information unit pacing credit is set to a second value for the first logical path, and for a newly established second logical path the information unit pacing credit is set to the second value that is greater than the default value; and
     allocating additional resources for consuming information units corresponding to an increased value of the information unit pacing credit, and restricting input/output (I/O) operations that previously used the additional resources.

6. The system of claim 5, wherein the default value is 16, and wherein the increased value is at least 64.

7. The system of claim 5, wherein persistent information unit pacing that supports the information unit pacing credit is implemented over a Fibre Channel connection, wherein the information unit pacing parameter is an IU pacing parameter of the Fibre Channel connection, and wherein in response to the IU pacing parameter being configured to allow use of an increased value for the information unit pacing credit that is greater than the default value for the information unit pacing credit by setting a value of the IU pacing parameter to be one or more, all existing logical paths are configured to allow transmission of a number of information units corresponding to the increased value of the information unit pacing credit.

8. The system of claim 5, wherein the information unit pacing credit to use is maintained for each logical path between a first device and a second device, wherein the information unit pacing credit is adjusted in response to an establishment of a logical path.

9. A computer program product, the computer program product comprising a computer readable storage medium having computer readable program code embodied therewith, the computer readable program code configured to perform operations, the operations comprising:
   in response to an information unit pacing parameter being set to a first value of zero, an information unit pacing credit is set to a default value for a first logical path that is established;
   subsequent to the information unit pacing credit being set to the default value for the first logical path, in response to the information unit pacing parameter being set to a second value that is greater than the default value, the information unit pacing credit is set to a second value for the first logical path, and for a newly established second logical path the information unit pacing credit is set to the second value that is greater than the default value; and
   allocating additional resources for consuming information units corresponding to an increased value of the information unit pacing credit, and restricting input/output (I/O) operations that previously used the additional resources.

10. The computer program product of claim 9, wherein the default value is 16, and wherein the increased value is at least 64.

11. The computer program product of claim 9, wherein persistent information unit pacing that supports the information unit pacing credit is implemented over a Fibre Channel connection, wherein the information unit pacing parameter is an IU pacing parameter of the Fibre Channel connection, and wherein in response to the IU pacing parameter being configured to allow use of an increased value for the information unit pacing credit that is greater than the default value for the information unit pacing credit by setting a value of the IU pacing parameter to be one or more, all existing logical paths are configured to allow transmission of a number of information units corresponding to the increased value of the information unit pacing credit.

12. The computer program product of claim 9, wherein the information unit pacing credit to use is maintained for each logical path between a first device and a second device, wherein the information unit pacing credit is adjusted in response to an establishment of a logical path.

13. The method of claim 1, wherein persistent information unit pacing that supports the information unit pacing credit is implemented over a Fibre Channel connection.

14. The method of claim 1, wherein the first logical path and the second logical path are established between a first device and a second device.

15. The system of claim 5, wherein persistent information unit pacing that supports the information unit pacing credit is implemented over a Fibre Channel connection.

16. The system of claim 5, wherein the first logical path and the second logical path are established between a first device and a second device.

17. The computer program product of claim 9, wherein persistent information unit pacing that supports the information unit pacing credit is implemented over a Fibre Channel connection.

18. The computer program product of claim 9, wherein the first logical path and the second logical path are established between a first device and a second device.

* * * * *